(12) United States Patent
Berg et al.

(10) Patent No.: US 8,100,064 B2
(45) Date of Patent: Jan. 24, 2012

(54) FUEL STAGING METHODS FOR LOW NOX TANGENTIAL FIRED BOILER OPERATION

(75) Inventors: Lawrence D. Berg, Monroe, CT (US); Edmund S. Schindler, Fairfield, CT (US); Nigel John Garrad, Milford, CT (US); John Joseph Halloran, Worchester, MA (US); Robert J. Collette, Windsor, CT (US)

(73) Assignee: Diesel & Combustion Technologies, LLC, Bethel, CT (US)

( * ) Notice: Subject to any disclaimer, the term of this patent is extended or adjusted under 35 U.S.C. 154(b) by 1718 days.

(21) Appl. No.: 11/047,000

(22) Filed: Jan. 31, 2005
(Under 37 CFR 1.47)

(65) Prior Publication Data

US 2005/0279263 A1    Dec. 22, 2005

(51) Int. Cl.
*F23B 5/00* (2006.01)
(52) U.S. Cl. ......... 110/213; 110/342; 110/345; 110/347
(58) Field of Classification Search ................. 110/342, 110/345, 347, 261, 263, 264, 213; 431/9
See application file for complete search history.

(56) References Cited

U.S. PATENT DOCUMENTS

| | | | |
|---|---|---|---|
| 4,089,637 A | 5/1978 | Smith et al. | 431/183 |
| 4,505,666 A | 3/1985 | Martin et al. | 431/175 |
| 4,539,918 A | 9/1985 | Beer et al. | 110/266 |
| 4,672,900 A * | 6/1987 | Santalla et al. | 110/264 |
| 4,845,940 A | 7/1989 | Beer | 60/732 |
| 5,315,939 A | 5/1994 | Rini et al. | 110/264 |
| 5,388,536 A | 2/1995 | Chung | 110/264 |
| 5,441,403 A | 8/1995 | Tanaka et al. | 431/175 |
| 5,535,686 A | 7/1996 | Chung | 110/264 |
| 5,593,298 A * | 1/1997 | Hurley et al. | 431/9 |
| 5,622,489 A | 4/1997 | Monro | 431/181 |
| 5,772,421 A | 6/1998 | Besik et al. | 431/8 |
| 5,799,594 A | 9/1998 | Dernjatin et al. | 110/265 |
| 5,879,148 A | 3/1999 | Cheng et al. | 431/9 |
| 6,089,855 A | 7/2000 | Becker et al. | 431/9 |
| 6,419,480 B2 | 7/2002 | Al-Halbouni | 431/351 |
| 6,425,755 B1 | 7/2002 | Pillard et al. | 431/159 |
| 6,790,031 B2 | 9/2004 | Berg et al. | 431/9 |
| 2003/0091948 A1* | 5/2003 | Bool et al. | 431/10 |

* cited by examiner

*Primary Examiner* — Kenneth Rinehart
(74) *Attorney, Agent, or Firm* — St. Onge Steward Johnston & Reens LLC

(57) ABSTRACT

A tangential fired boiler includes a circumferential wall defining a combustion zone, the circumferential wall being generally rectangular when viewed along a generally horizontal cross-section. A fireball is disposed within the combustion zone, the fireball rotating about an imaginary axis when viewed along a generally horizontal cross-section. A corner member is disposed proximate to at least one corner of the combustion zone, with a plurality of fuel inlets disposed along the corner member. The plurality of fuel inlets inject fuel into the combustion zone, and at least some of the plurality of fuel inlets inject fuel in a direction which is angled with respect to a normal of the corner member and upstream relative to a direction of rotation of the fireball.

22 Claims, 11 Drawing Sheets

FUEL STAGING METHODS FOR LOW NOX TANGENTIAL FIRED BOILER OPERATION

FIELD OF THE INVENTION

The present invention relates generally to a tangential fired boiler, and more particularly to a tangential fired boiler which produces reduced levels of pollution components from a combustion process as compared to traditional tangential fired boilers.

BACKGROUND OF THE INVENTION

As is well-known, the combustion of fossil fuels (i.e., coal, natural gas, oil) in boilers, furnaces and the like leads to the creation of various pollution components. One of such pollution components is NOx (the various combinations of nitrogen and oxygen, primarily NO and $NO_2$), a pollutant that leads to smog and acid rain, especially in urban environments. Generally, the nitrogen for the formation of NOx comes from air that is introduced into the boiler for combustion, as air consists of approximately 21% oxygen and 79% nitrogen, or from the fuel itself when certain fuels are used. Therefore, when oxygen is burned in a boiler, nitrogen is always present.

At high temperatures the nitrogen will combine with the oxygen to form NOx. Moreover, as the temperatures within the boiler increase, the formation of NOx also increases. At approximately 2200° F. NOx begins to form. As the temperature in the boiler increases beyond this temperature, the formation of NOx increases rapidly. At temperatures over approximately 2780° F. the formation of NOx generally doubles for each increase of about 190° F. This is referred to as thermal NOx. Another type of NOx is known as fuel NOx, in which fuel-bound nitrogen (FBN) is the major source of NOx emissions from combustion of nitrogen-bearing fuels such as heavy oils, coal, and coke. Under the reducing conditions surrounding the burning droplet or particle, the FBN is converted to fixed nitrogen species such as HCN and $NH_3$. These, in turn, are readily oxidized to form NOx if they reach the lean zone of the flame. Under the proper conditions, however, it has been found that these fixed nitrogen species may be converted to molecular nitrogen, thus avoiding the NOx formation path Systems and methods for reducing various pollution components, such as NOx, produced during combustion processes are known. One example of such a NOx control process is catalytic reduction, in which the relatively cool combustion effluent of several hundred degrees Fahrenheit is passed over a catalyst coated bed in the presence of ammonia. This process is called selective catalytic reduction (SCR). However, while SCR is relatively effective at reducing NOx emissions (it can reduce NOx by more than 90% in some instances), it is a relatively complex process which is relatively expensive both to implement and to operate. Moreover, the more NOx that is present in the combustion effluent, the higher the operating costs for NOx neutralizing processes such as SCR (caused by increased ammonia consumption and decreased catalyst life). Thus, even if a NOx neutralizing process is employed, it would still be desirable to reduce the amount of NOx produced during the combustion step itself.

To date, much of the effort to reduce NOx created during combustion has focused on the design and operation of individual burners themselves. For example, U.S. Pat. No. 4,539,918 discloses a multi-annular swirl burner which includes a plurality of overlapping tubular wall members which form a rich combustion zone and a lean combustion zone with a throat section therebetween. Other references, such as U.S. Pat. No. 4,505,666, relate to burners which employ fuel staging to reduce the amount of NOx produced by the burners. These arrangements are designed to reduce the amount of NOx produced by the burner. However, reducing the amount of NOx produced by individual burners may not provide sufficient NOx reduction when a plurality of such burners are arranged together in a tangential fired boiler. This is true because while the temperature profile in each individual burner may be conducive to producing low NOx, when a plurality of burners are fired together in the boiler, the temperature profile in the boiler may be such that relatively high levels of NOx are produced. Moreover, even though the burners themselves may achieve fuel staging on an individual level, no known systems achieve fuel staging on the furnace level.

U.S. Pat. No. 5,315,939 does disclose an integrated low NOx tangential firing system that is claimed to be particularly suited for use with pulverized solid fuel-fired furnaces, and a method of operating a pulverized solid fuel-fired furnace equipped with an integrated low NOx tangential firing system. However, the system disclosed therein relies upon directional control of the air source. This is disadvantageous in that such systems may not provide adequate NOx reduction.

What is desired, therefore, is a tangential fired boiler which produces relatively low levels of NOx, which produces a relatively low level of NOx during combustion in addition to or instead of neutralizing the NOx produced during combustion, which maintains a temperature profile therewithin that is conducive to producing relatively low levels of NOx, which employs fuel staging on the boiler level rather than merely on the burner level, and which is relatively simple and inexpensive to install and operate.

SUMMARY OF THE INVENTION

Accordingly, it is an object of the present invention to provide a tangential fired boiler which produces relatively low levels of NOx.

Another object of the present invention is to provide a tangential fired boiler having the above characteristics and which produces a relatively low level of NOx during combustion in addition to or instead of neutralizing the NOx produced during combustion.

A further object of the present invention is to provide a tangential fired boiler having the above characteristics and which maintains a temperature profile therewithin that is conducive to producing relatively low levels of NOx.

Yet another object of the present invention is to provide a tangential fired boiler having the above characteristics and which employs fuel staging on the boiler level rather than merely on the burner level.

Yet a further object of the present invention is to provide a tangential fired boiler having the above characteristics and which is relatively simple and inexpensive to install and operate.

These and other objects of the present invention are achieved according to one embodiment of the present invention by provision of a tangential fired boiler comprising a circumferential wall defining a combustion zone, the circumferential wall being generally rectangular when viewed along a generally horizontal cross-section. A fireball is disposed within the combustion zone, the fireball rotating about an imaginary axis when viewed along a generally horizontal cross-section. A corner member is disposed proximate to at least one corner of the combustion zone, with a plurality of fuel inlets disposed along the corner member. The plurality of fuel inlets inject fuel into the combustion zone, and at least some of the plurality of fuel inlets inject fuel in a direction which is angled with respect to a normal of the corner member and upstream relative to a direction of rotation of the fireball.

In some embodiments, the tangential fired boiler further comprises a plurality of air inlets disposed along the corner member, the plurality of air inlets injecting air into the combustion zone. In certain of these embodiments, at least some of the plurality of air inlets inject air in a direction normal to the corner member. In some embodiments, the generally rectangular circumferential wall has a diagonal, and the corner member is angled with respect to a normal of the diagonal and downstream relative to a direction of rotation of the fireball. In certain of these embodiments, the corner member is angled with respect to the normal of the diagonal at an angle of about 6 degrees. In certain embodiments, an angle of the corner member with respect to a normal of the diagonal is adjustable in order to fine-tune performance of the boiler.

In some embodiments, the angle at which the plurality of fuel inlets inject fuel with respect to a normal of the corner member is greater than zero degrees and less than 45 degrees. In certain of these embodiments, the angle at which the plurality of fuel inlets inject fuel with respect to a normal of the corner member is between about 15 degrees and about 25 degrees. In some embodiments, a corner member and a plurality of fuel inlets are disposed proximate to each corner of the combustion zone. In some embodiments, fuel is injected uniformly through the plurality of fuel inlets. In other embodiments, fuel is injected non-uniformly through the plurality of fuel inlets.

In some embodiments, the corner member is disposed in the at least one corner of the combustion zone. In some embodiments, the corner member is disposed offset from, but near, the at least one corner of the combustion zone and in a sidewall of the circumferential wall for convenience in arrangement. In certain of these embodiments, the corner member is offset from the at least one corner of the combustion zone downstream relative to the direction of rotation of the fireball, whereby fuel can be injected at a greater angle with respect to a normal of the corner member in order to overcome mechanical limitation or obstruction.

In accordance with another embodiment of the present invention, a tangential fired boiler comprises a circumferential wall defining a combustion zone, the circumferential wall being generally rectangular when viewed along a generally horizontal cross-section and having a diagonal. A fireball is disposed within the combustion zone, the fireball rotating about an imaginary axis when viewed along a generally horizontal cross-section. A corner member is disposed proximate to at least one corner of the combustion zone, the corner member being angled with respect to a normal of the diagonal and downstream relative to a direction of rotation of the fireball. A plurality of fuel inlets are disposed along the corner member, the plurality of fuel inlets injecting fuel into the combustion zone, and a plurality of air inlets are disposed along the corner member, the plurality of air inlets injecting air into the combustion zone. At least some of the plurality of fuel inlets inject fuel in a direction which is angled between about 15 degrees and about 25 degrees with respect to a normal of the corner member and upstream relative to a direction of rotation of the fireball.

In some embodiments, at least some of the plurality of air inlets inject air in a direction normal to the corner member. In some embodiments, the corner member is angled with respect to the normal of the diagonal at an angle of about 6 degrees. In certain embodiments, an angle of the corner member with respect to a normal of the diagonal is adjustable in order to fine-tune performance of the boiler. In some embodiments, an angle of the corner member with respect to a normal of the diagonal is adjustable in order to fine-tune performance of the boiler. In some embodiments, a corner member and a plurality of fuel inlets are disposed proximate to each corner of the combustion zone. In some embodiments, fuel is injected uniformly through the plurality of fuel inlets. In some embodiments, fuel is injected non-uniformly through the plurality of fuel inlets.

In some embodiments, the corner member is disposed in the at least one corner of the combustion zone. In some embodiments, the corner member is disposed offset from, but near, the at least one corner of the combustion zone and in a sidewall of the circumferential wall for convenience in arrangement. In certain of these embodiments, the corner member is offset from the at least one corner of the combustion zone downstream relative to the direction of rotation of the fireball, whereby fuel can be injected at a greater angle with respect to a normal of the corner member in order to overcome mechanical limitation or obstruction.

In accordance with another aspect of the present invention, a method of firing a tangential fired boiler comprises the steps of: (i) defining a combustion zone with a circumferential wall, the circumferential wall being generally rectangular when viewed along a generally horizontal cross-section; (ii) creating a fireball within the combustion zone, the fireball rotating about an imaginary axis when viewed along a generally horizontal cross-section; (iii) injecting fuel into the combustion zone through a plurality of fuel inlets disposed along a corner member disposed proximate to at least one corner of the combustion zone; and (iv) directing fuel injected though at least some of the plurality of fuel inlets in a direction which is angled with respect to a normal of the corner member and upstream relative to a direction of rotation of the fireball.

The invention and its particular features and advantages will become more apparent from the following detailed description considered with reference to the accompanying drawings.

DETAILED DESCRIPTION OF EMBODIMENTS OF THE INVENTION

Figure 1:
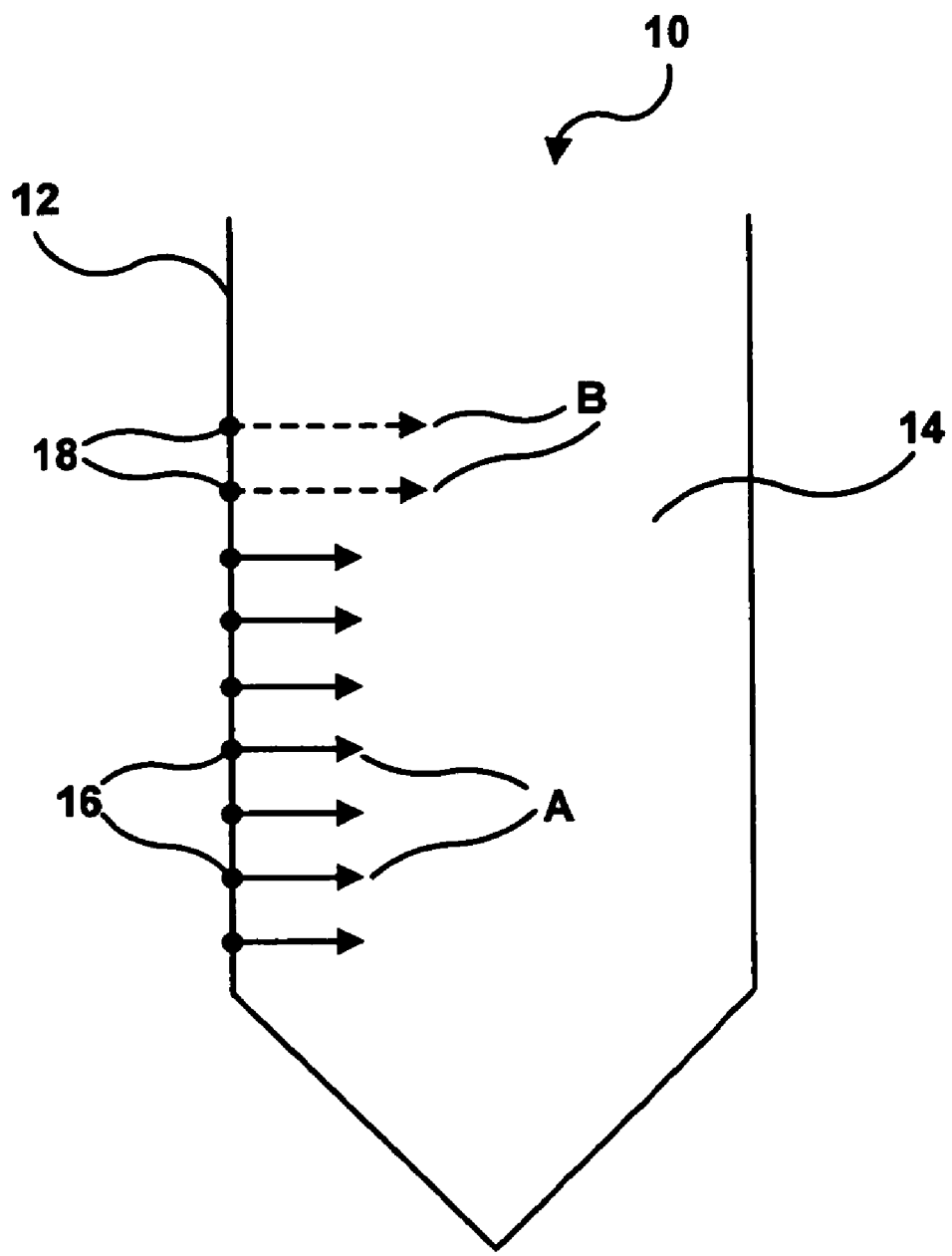
FIG. 1 is a schematic side view of a tangential fired boiler in accordance with the prior art.

Referring first to FIG. 1, a tangential fired boiler 10 in accordance with a known prior art design is shown. Tangential fired boiler 10 includes a circumferential wall 12 defining a combustion zone 14 and a plurality of fuel inlets 16 disposed substantially vertically along circumferential wall 12. Fuel is injected (indicated by arrows A) at a uniform rate through each of fuel inlets 16. This leads to a generally uniform fuel/oxygen distribution within combustion zone 14, which in turn creates a relatively large area in which fuel is rapidly burned and in which NOx is rapidly created.

Tangential fired boiler 10 may optionally be provided with an overfire air system to divert secondary air above the top fuel inlet rows. Such a system is designed to inject air through air inlets 18 at the proper velocity (indicated by dashed arrows B) to complete combustion prior to the boiler exit. Although the overfire air injected through air inlets 18 may not be uniform with air being injected lower in the boiler, in known tangential fired boiler 10, the rate at which fuel is injected through each fuel inlet 16 is uniform.

Figure 2A:
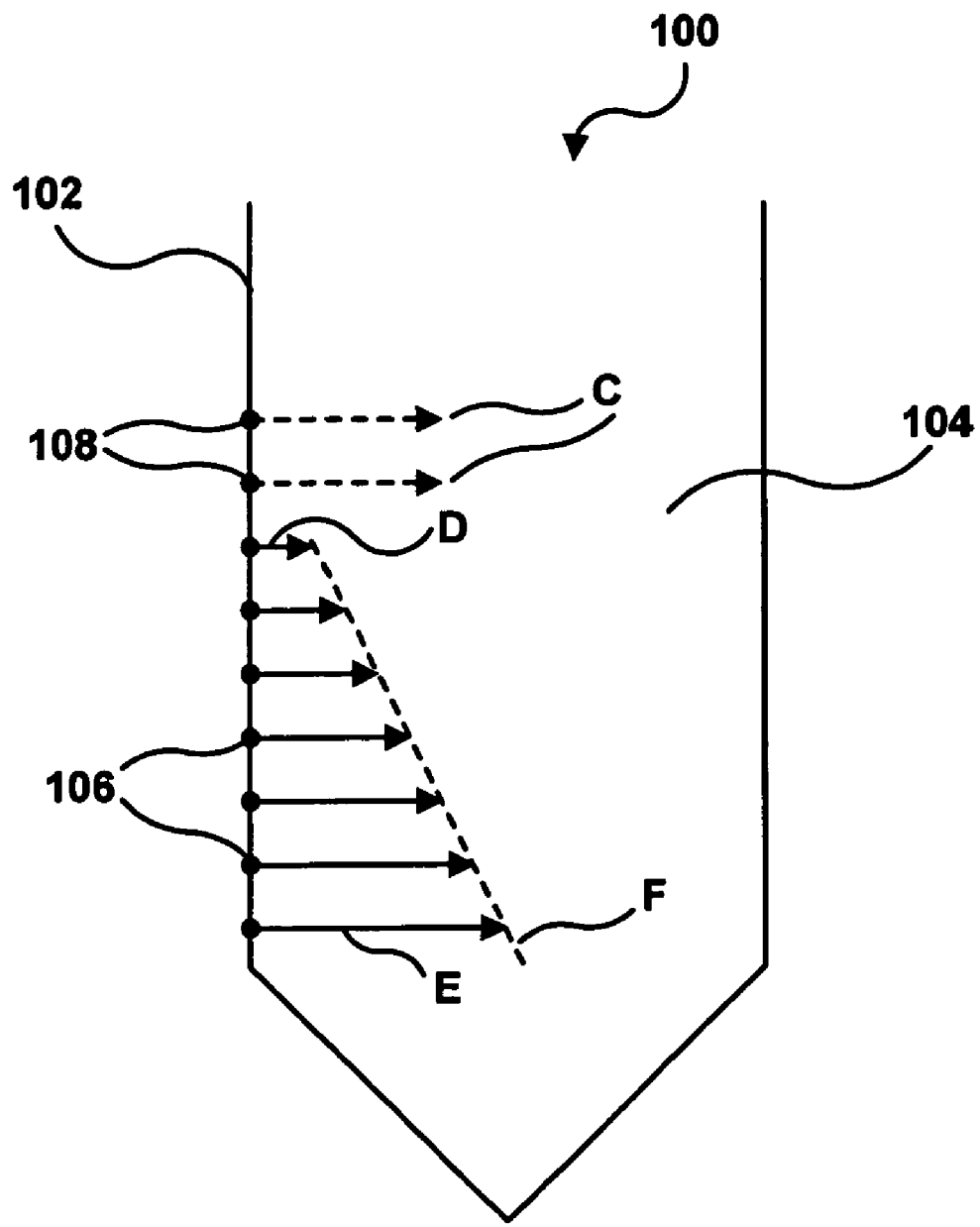
FIGS. 2A and 2B are schematic side views of a tangential fired boiler in accordance with two embodiments of the present invention.
Figure 2B:
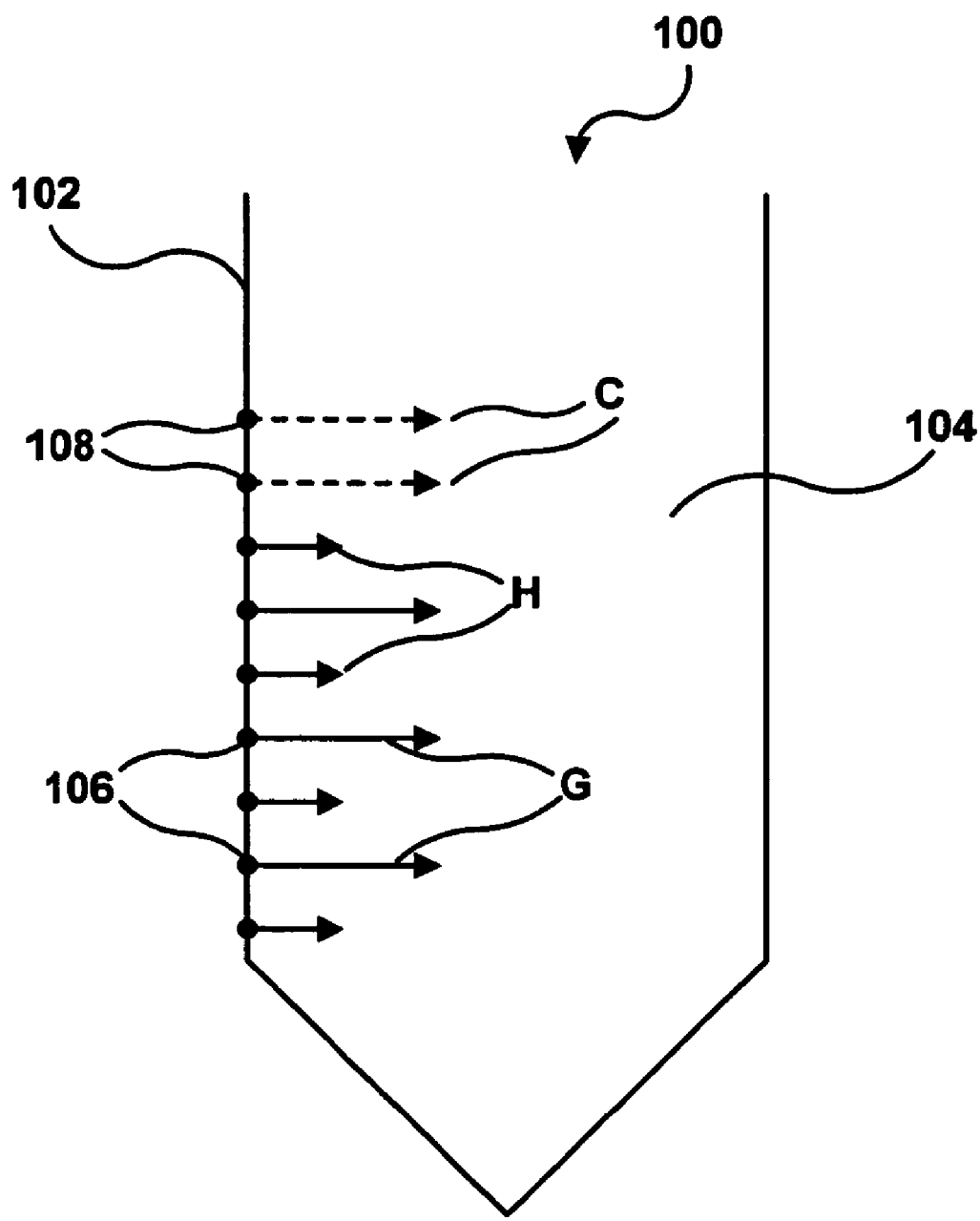

Referring now to FIGS. 2A and 2B, a tangential fired boiler 100 in accordance with a first embodiment of the present invention is shown. Like known tangential fired boiler 10, tangential fired boiler 100 includes a circumferential wall 102 defining a combustion zone 104 and a plurality of fuel inlets 106 disposed substantially vertically along circumferential wall 102. However, unlike known tangential fired boiler, in tangential fired boiler 100, fuel is injected at a non-uniform rate through fuel inlets 106.

When the term "non-uniform rate" is used herein, what is meant is that the rate at which fuel is injected is not identical for every fuel inlet. It should be noted, however, that is possible for the rate at which fuel is injected through two or more fuel inlets to be identical. All that is required by "non-uniform rate" is that the rate at which fuel is injected through at least one fuel inlet be substantially different that the rate at which fuel is injected through at least one other fuel inlet.

Because fuel is injected at a non-uniform rate through fuel inlets 106, localized fuel rich, oxygen poor zones and fuel lean, oxygen rich zones may be created within the combustion zone. This causes the fuel to be burned more slowly, which leads to less NOx being created. Fuel is mixed with ambient furnace gases in the oxygen poor zone, thus effecting fuel staging. Because of the specific configuration of the boiler and the locations of the fuel inlets, this embodiment achieves a vertical fuel staged furnace.

Although the fuel injected into tangential fired boiler 100 may comprise any of numerous known fuels, it has been found that tangential fired boiler 100 is particularly well suited for use with natural gas. It should also be noted that fuel inlets 106 may be constant rate fuel inlets, may by variable rate fuel inlets or may be a combination of both, as is known in the art. Like tangential fired boiler 10, tangential fired boiler 100 may optionally be provided with an overfire air system to divert secondary air (indicated by dashed arrows C) above the top fuel inlet 106 rows.

Referring now specifically to FIG. 2A, the plurality of fuel inlets 106 may be arranged such that an uppermost fuel inlet injects fuel at a lowest rate (indicated by arrow D), a lowermost fuel inlet injects fuel at a highest rate (indicated by arrow E), and fuel inlets located between the uppermost and lowermost fuel inlets inject fuel at intermediate rates along a gradient (indicated by dashed line F). Employing this arrangement causes a localized fuel rich, oxygen poor zone to be created toward a bottom of combustion zone 104 and a fuel lean, oxygen rich zone to be created toward a top of combustion zone 104.

Of course, other configurations for the rates at which fuel is injected through fuel inlets 106 are also possible. Referring to FIG. 2B, for example, the rates at which fuel is introduced through fuel inlets 106 may simply be staggered between those through which fuel is introduced at a higher rate (indicated by arrows G) and those through which fuel is introduced at a lower rate (indicated by arrows H). Employing this arrangement would cause a plurality of localized fuel rich, oxygen poor zones to be created within combustion zone 104 adjacent to the fuel inlets 106 through which fuel is introduced at a higher rate (indicated by arrows G) and a plurality of fuel lean, oxygen rich zones to be created therebetween.

Figure 3:
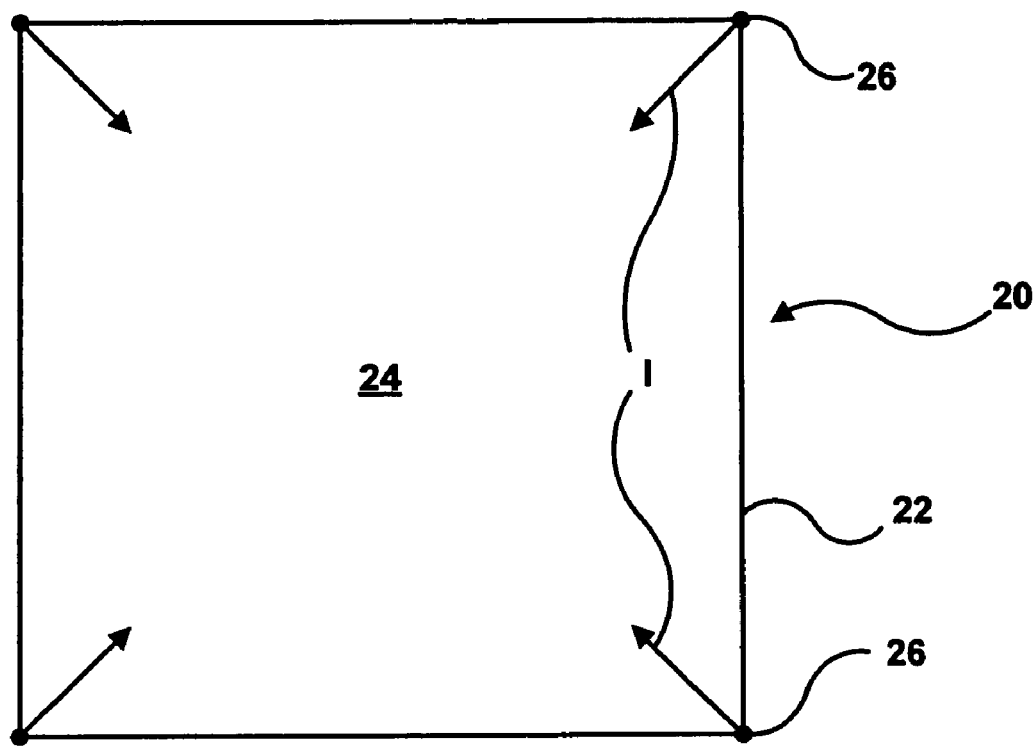
FIG. 3 is a schematic top view of a tangential fired boiler in accordance with the prior art.

Referring now to FIG. 3, another tangential fired boiler 20 in accordance with a known prior art design is shown. Tangential fired boiler 20 includes a circumferential wall 22 defining a combustion zone 24 and a plurality of fuel inlets 26. Combustion zone 24 is generally rectangular when viewed along a generally horizontal cross-section. The plurality of fuel inlets 26 are disposed within the four corners of combustion zone 24. Fuel is injected (indicated by arrows I) at a uniform rate through each of fuel inlets 26. This leads to a generally uniform fuel/oxygen distribution within combustion zone 24, which in turn creates a relatively large area in which fuel is rapidly burned and in which NOx is rapidly created.

Figure 4:
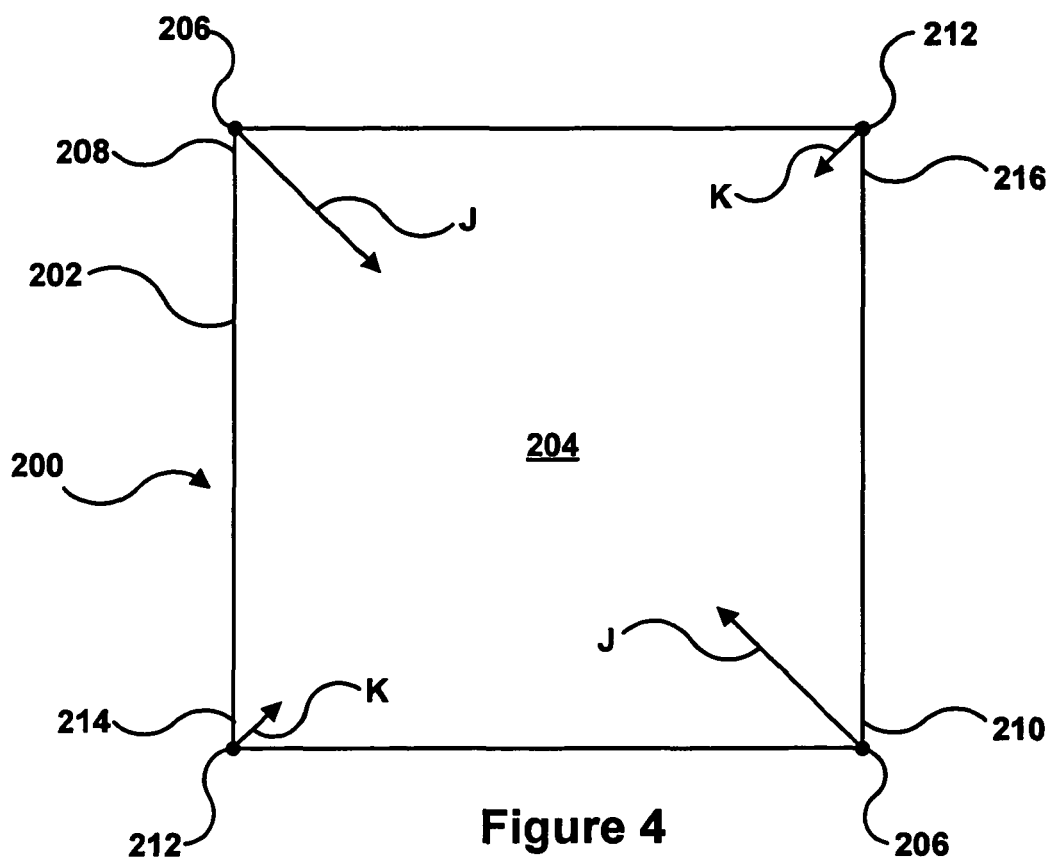
FIG. 4 is a schematic top view of a tangential fired boiler in accordance with another embodiment of the present invention.

In another embodiment of the present invention, shown in FIG. 4, a tangential fired boiler 200 includes a circumferential wall 202 defining a combustion zone 204. Combustion zone 204 is generally rectangular when viewed along a generally horizontal cross-section. A first set 206 of fuel inlets are disposed in two diagonally opposed corners 208, 210 of circumferential wall 202 and a second set 212 of fuel inlets are disposed in the other two 214, 216 of the diagonally opposed corners of circumferential wall 202. The first set 206 of fuel inlets inject fuel (indicated by arrows J) at a higher rate than the second set 212 of fuel inlets (indicated by arrows K). Localized fuel rich, oxygen poor zones are created toward the first set of fuel inlets, while fuel lean, oxygen rich zones are created toward the second set of fuel inlets. Fuel is mixed with ambient furnace gases in the oxygen poor zones, thus effecting fuel staging. Because of the specific configuration of the boiler and the locations of the fuel inlets, this embodiment achieves a tangential fuel staged furnace.

Figure 5A:
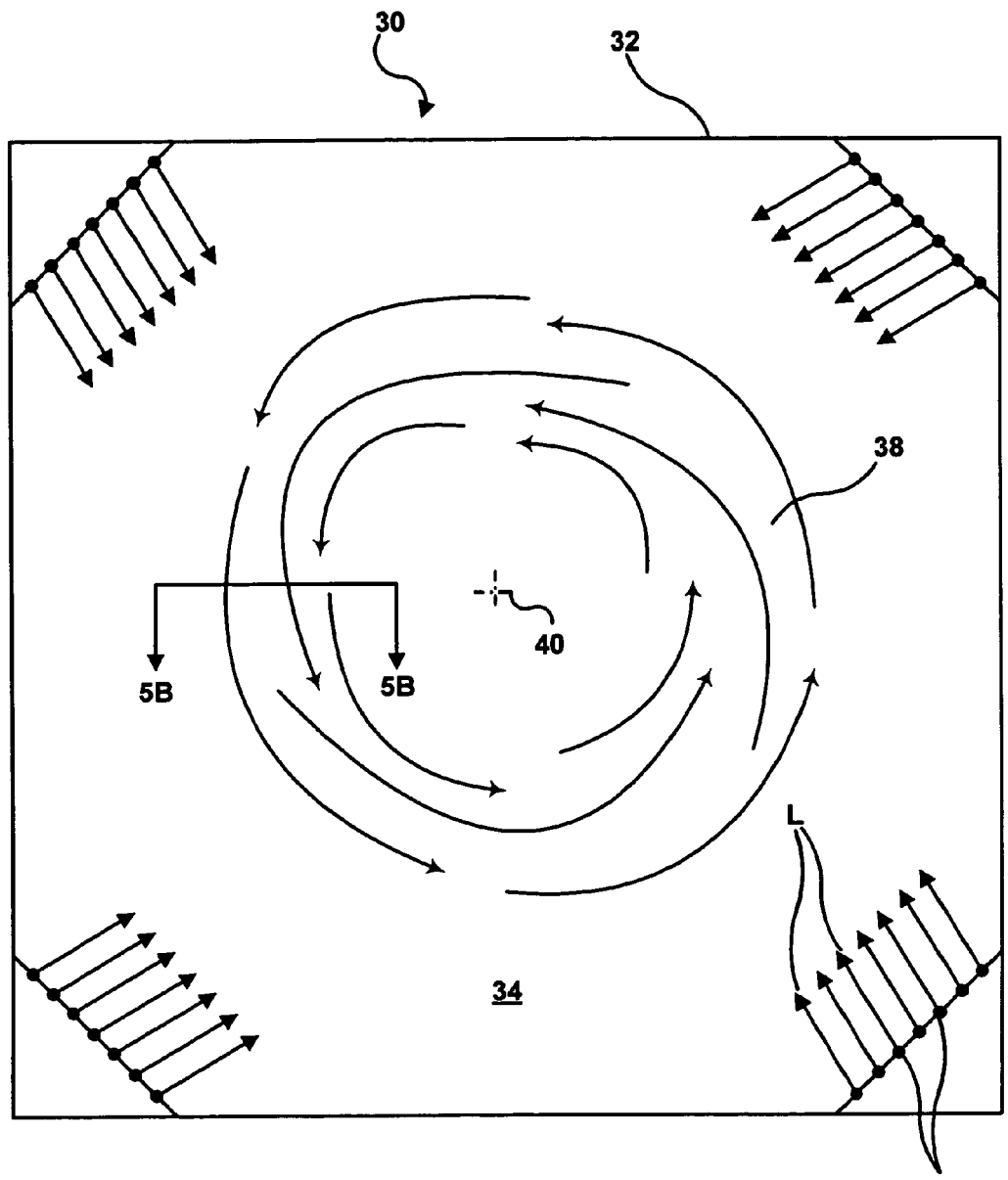
FIG. 5A is a schematic top view of a tangential fired boiler in accordance with the prior art.

Referring now to FIG. 5A, yet another tangential fired boiler 30 in accordance with a known prior art design is shown. Tangential fired boiler 30 includes a circumferential wall 32 defining a combustion zone 34 and a plurality of fuel inlets 36. Combustion zone 34 is generally rectangular when viewed along a generally horizontal cross-section. Combustion zone 34 has a fireball 38 disposed therein fed by fuel injected by the plurality of fuel inlets 36, the fireball 38 rotating about an imaginary axis 40 when viewed along a generally horizontal cross-section.

Figure 5B:
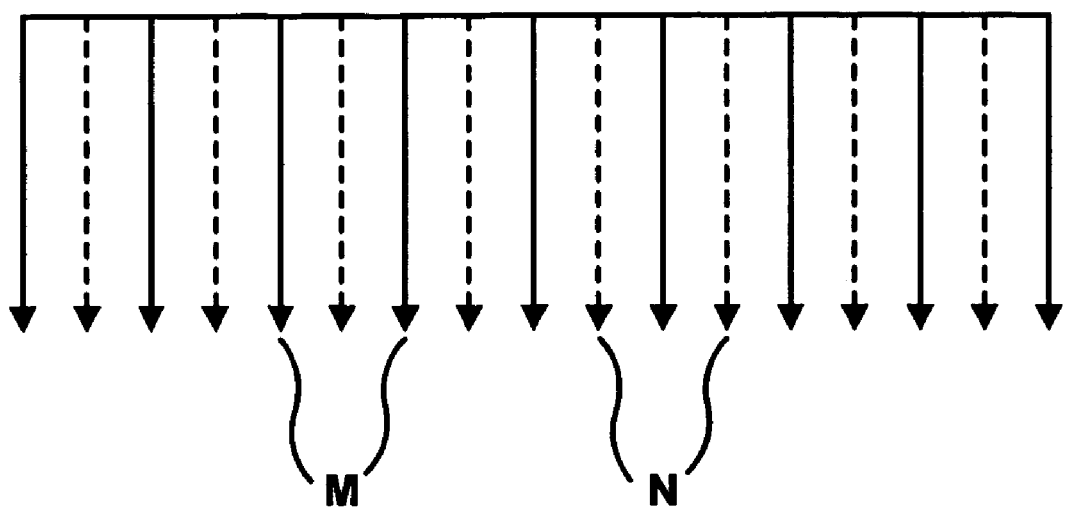
FIG. 5B is a schematic sectional view illustrating the fuel and air distribution of the prior art tangential fired boiler taken along line 5B-5B of FIG. 5A.

A set of the plurality of fuel inlets 36 is disposed vertically in each of the corners of the circumferential wall 32. Fuel is injected (indicated by arrows L) at a uniform rate through each of fuel inlets 36 comprising each set of fuel inlets. This leads to a generally uniform fuel/oxygen distribution within combustion zone 34, and more particularly within the fireball 38. This is illustrated in more detail in FIG. 5B, which shows the generally uniform distribution of fuel (indicated by solid arrows M) and oxygen or air (indicated by dashed arrows N). This relatively uniform fuel/oxygen distribution in turn creates a relatively large area within combustion zone 34 in which fuel is rapidly burned and in which NOx is rapidly created.

Figure 6A:
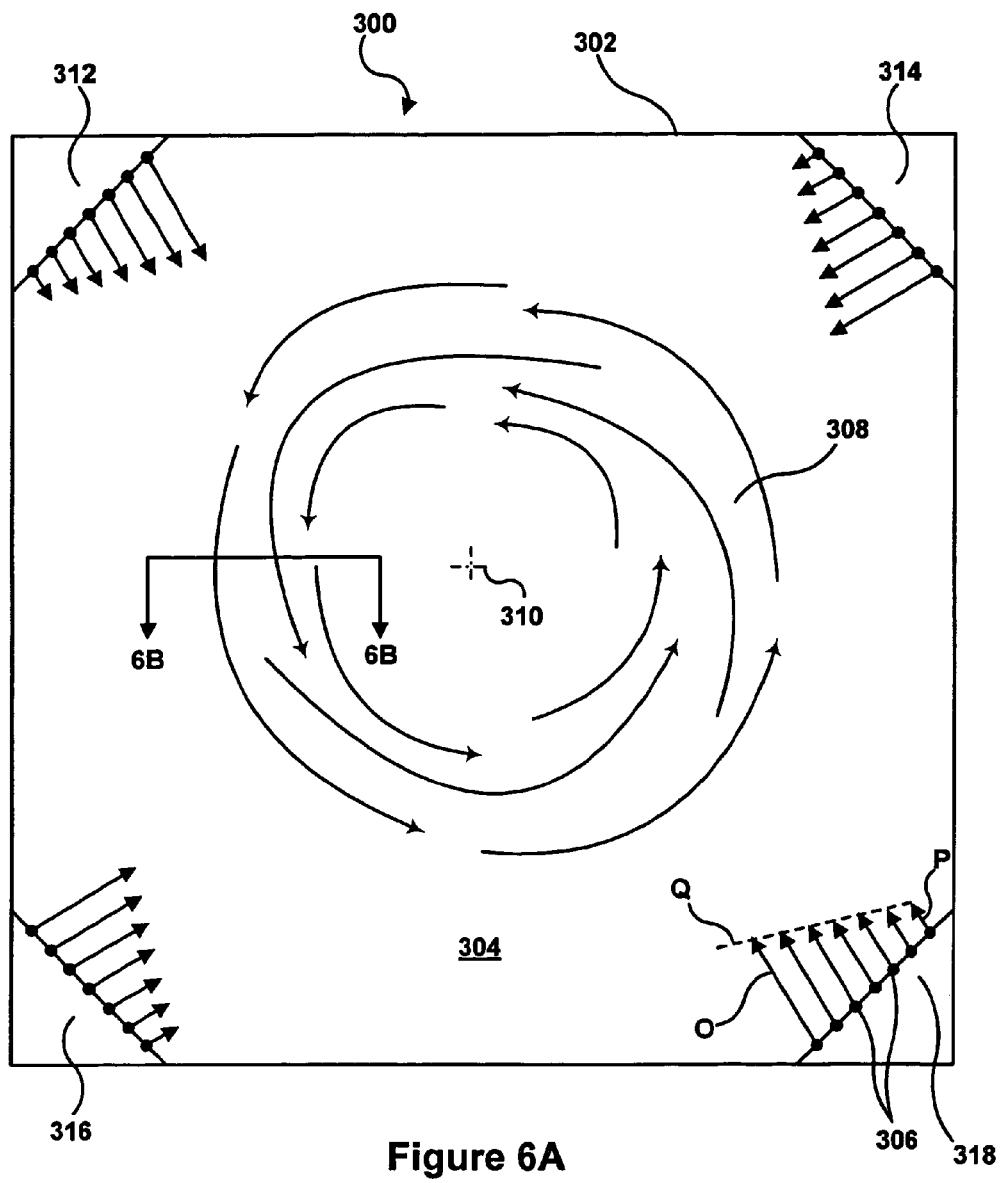
FIG. 6A is a schematic top view of a tangential fired boiler in accordance another embodiment of the present invention.

Referring now to FIG. 6A, another embodiment of a tangential fired boiler 300 in accordance with the present invention is shown. Tangential fired boiler 300 includes a circumferential wall 302 defining a combustion zone 304 and a plurality of fuel inlets 306. Combustion zone 304 is generally rectangular when viewed along a generally horizontal cross-section. Combustion zone 304 has a fireball 308 disposed therein fed by fuel injected by the plurality of fuel inlets 306, the fireball 308 rotating about an imaginary axis 310 when viewed along a generally horizontal cross-section.

Figure 6B:
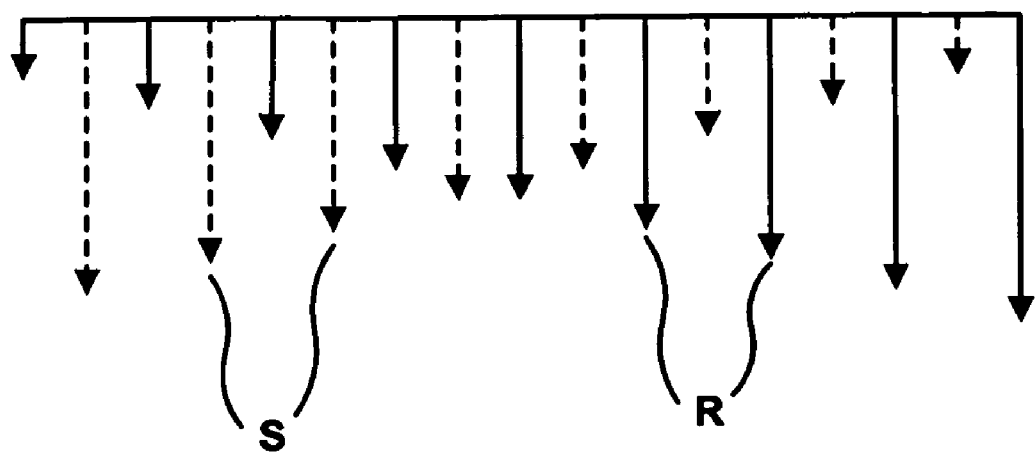
FIG. 6B is a schematic sectional view illustrating the fuel and air distribution of the tangential fired boiler taken along line 6B-6B of FIG. 6A.

A set 312, 314, 316, 318 of the plurality of fuel inlets 306 is disposed in each of the corners of the circumferential wall. The fuel inlets comprising each set 312, 314, 316, 318 inject fuel at non-uniform rates. More specifically, the fuel inlets comprising each set 312, 314, 316, 318 are spaced apart horizontally, and the fuel inlets comprising each set 312, 314, 316, 318 are arranged such that a fuel inlet located most upstream with respect to rotation of the fireball 308 injects fuel at a highest rate (indicated by arrow O), a fuel inlet located most downstream with respect to rotation of the fireball 308 injects fuel at a lowest rate (indicated by arrow P), and fuel inlets located between the most upstream and most downstream fuel inlets inject fuel at intermediate rates along a gradient (indicated by dashed line Q) such that a localized fuel rich, oxygen poor zone is created toward a center of the combustion zone 304 and a fuel lean, oxygen rich zone is created toward a periphery of the combustion zone 304. This is illustrated in more detail in FIG. 6B, which shows the generally non-uniform distribution of fuel (indicated by solid arrows R) and oxygen or air (indicated by dashed arrows S). Fuel is mixed with ambient furnace gases in the oxygen poor zone, thus effecting fuel staging. Because of the specific configuration of the boiler and the locations of the fuel inlets, this embodiment achieves a radial fuel staged furnace.

Another way of reducing NOx in tangential fired boilers, which is different than the non-uniform injection embodiments described above, is depicted in FIGS. 7A through 7C.

Figure 7A:
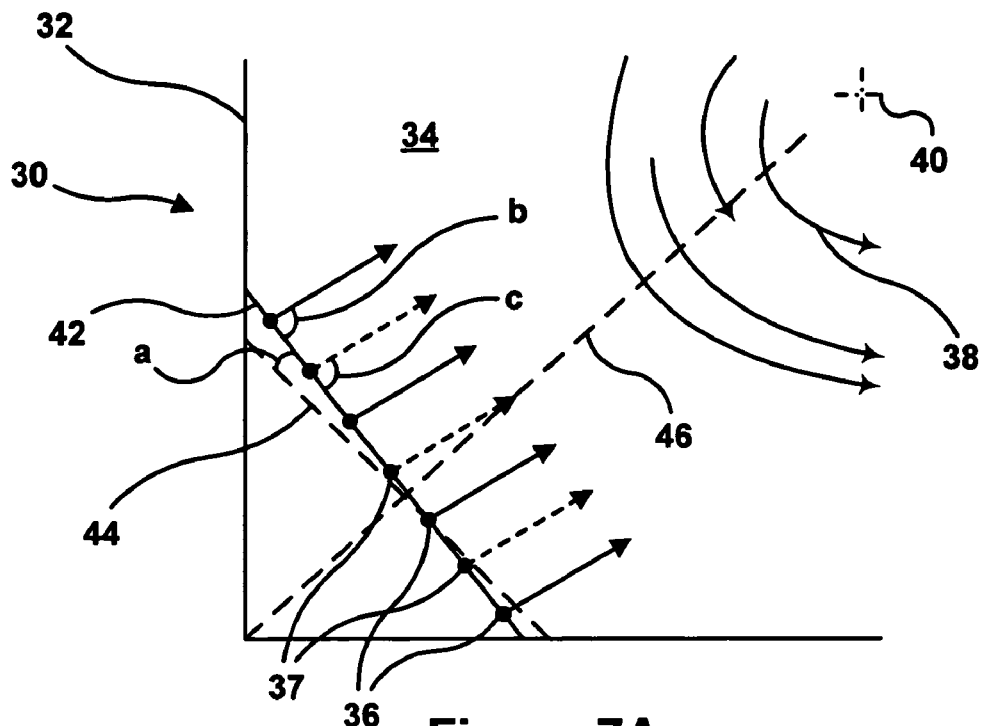
FIG. 7A is a schematic top view of a portion of the tangential fired boiler in accordance with the prior art shown in FIG. 5A.

FIG. 7A shows in greater detail one of the corners of the tangential fired boiler 30 in accordance with the known prior art design shown in FIG. 5A. Tangential fired boiler 30 includes a circumferential wall 32 defining a combustion zone 34, a plurality of fuel inlets 36 and a plurality of air inlets 37 (not shown in FIG. 5A for the sake of clarity). Combustion zone 34 is generally rectangular when viewed along a generally horizontal cross-section. Combustion zone 34 has a fireball 38 disposed therein fed by fuel injected by the plurality of fuel inlets 36 and by air injected by the plurality of air inlets 37, the fireball 38 rotating about an imaginary axis 40 when viewed along a generally horizontal cross-section.

A set of the plurality of fuel inlets 36 and air inlets 37 is disposed in each of the corners of the circumferential wall 32. As is known in the art, a corner member 42 is disposed in each corner of the circumferential wall 32, with the fuel inlets 36 and the air inlets 37 disposed therein or thereon. Also as is known in the art, the corner member 42 is generally angled (indicated by reference character a) with respect to the normal (indicated by dashed line 44) of the diagonal (indicated by dashed line 46) of the rectangular combustion zone 34. As is known, the angle (a) is generally about 6 degrees, although such is not strictly required.

In accordance with prior art designs, the plurality of fuel inlets 36 are positioned such that the fuel is injected (indicated by solid arrows in FIG. 7A) normal to the corner member 42, i.e. such that angle (b) is 90 degrees. The air inlets 37 may also be oriented such that the air is injected (indicated by dashed arrows in FIG. 7A) normal to the corner member 42, i.e., such that angle (c) is 90 degrees, although it is known that the angle of air injection (c) may be varied. This orientation has been thought to be necessary in order to keep the fireball 38 rotating about imaginary axis 40. However, this leads to a generally uniform fuel/oxygen distribution within combustion zone 34, and more particularly within the fireball 38. As discussed above, this is illustrated in more detail in FIG. 5B, which shows the generally uniform distribution of fuel (indicated by solid arrows M) and oxygen (indicated by dashed arrows N). This relatively uniform fuel/oxygen distribution in turn creates a relatively large area within combustion zone 34 in which fuel is rapidly burned and in which NOx is rapidly created.

Figure 7B:
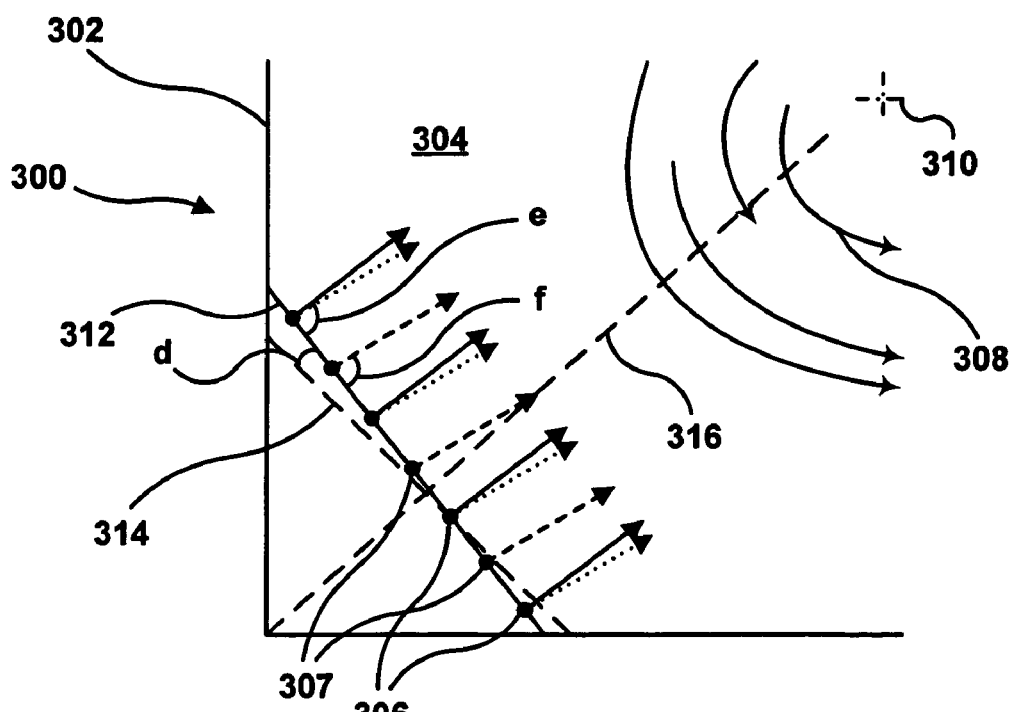
FIGS. 7B and 7C are schematic top views of a portion of the tangential fired boiler in accordance with another embodiment of the present invention.
Figure 7C:
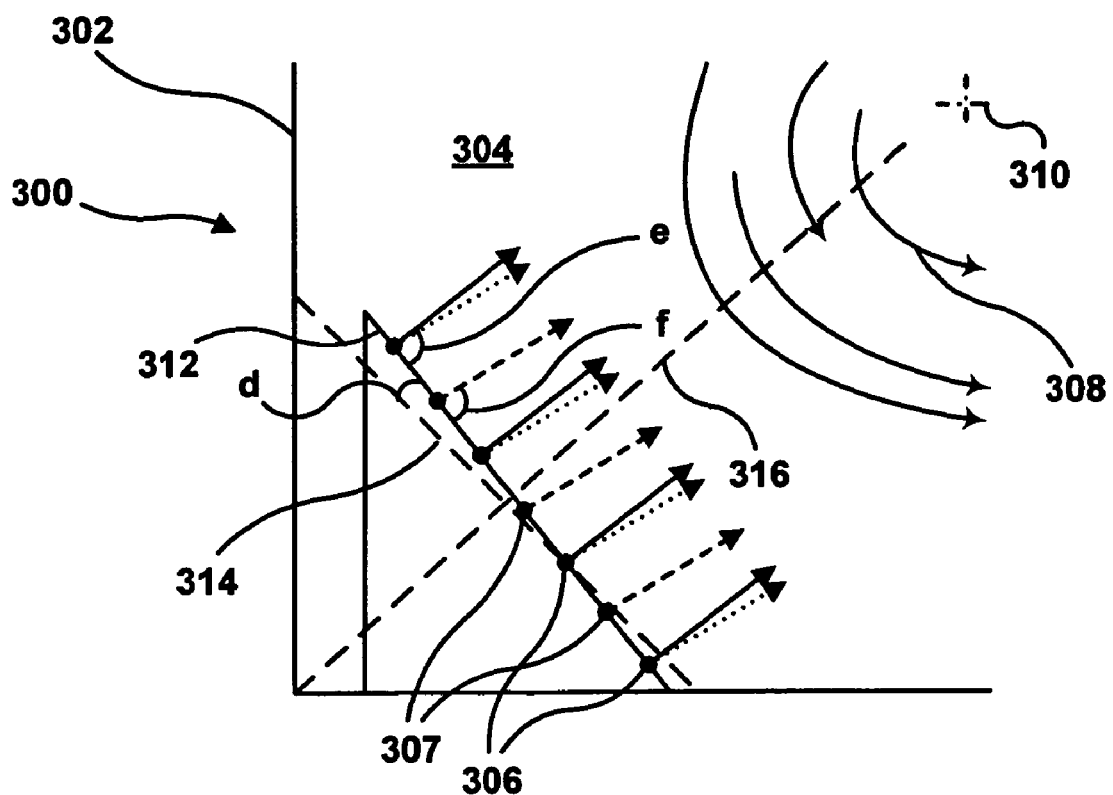

FIGS. 7B and 7C show in greater detail one of the corners of a tangential fired boiler 300 in accordance with another embodiment the present invention. Tangential fired boiler 300 includes a circumferential wall 302 defining a combustion zone 304, a plurality of fuel inlets 306, and a plurality of air inlets 307. Combustion zone 304 is generally rectangular when viewed along a generally horizontal cross-section. Combustion zone 304 has a fireball 308 disposed therein fed by fuel injected by the plurality of fuel inlets 306 and by air injected by the plurality of air inlets 307, the fireball 308 rotating about an imaginary axis 310 when viewed along a generally horizontal cross-section.

A set of the plurality of fuel inlets 306 and air inlets 307 is disposed proximate to (i.e., in or conveniently near) each of the corners of the circumferential wall 302. A corner member 312 is disposed proximate to (i.e., in or conveniently near) each corner of the circumferential wall 302, with the fuel inlets 306 and the air inlets 307 disposed therein, thereon or near thereto. More specifically, the corner member 312 may is disposed in each corner the circumferential wall 302 (as shown in FIG. 7B) or it may be disposed offset from, but near, the corner and in a sidewall of the circumferential wall 302 for convenience in arrangement (as shown in FIG. 7C). In the latter case, it may be preferable that the corner member 312 be offset from the corner of the circumferential wall 302 downstream relative to the direction of rotation of the fireball 308 fireball, whereby fuel can be injected at a greater angle with respect to a normal of the corner member 312 in order to overcome mechanical limitation or obstruction.

The corner member 312 is generally angled (indicated by reference character d) with respect to the normal (indicated by dashed line 314) of the diagonal (indicated by dashed line 316) of the rectangular combustion zone 304. The angle (a) may be generally about 6 degrees, although such is not strictly required and numerous other angles (a) may be employed. The angle (a) may be varied during installation or thereafter such that the performance of the boiler 300 may be fine-tuned.

In accordance with the present invention, and unlike prior art designs, at least some of the plurality of fuel inlets 306 are positioned such that the fuel is injected (indicated by solid arrows in FIG. 7B) upstream with respect to the normal (indicated by dotted arrows in FIG. 7B) of the corner member 312. What is meant by "upstream" is that the fuel is angled with respect to the normal (indicated by dotted arrows in FIG. 7B) of the corner member 312 in a direction which faces into (or brings the fuel flow closer to facing into) the rotating fireball 308. Thus, as shown in FIG. 7B, the angle (e) of fuel injection with respect to the corner member 312 is greater than 90 degrees. The air inlets 307 may be oriented such that the air is injected (indicated by dashed arrows in FIG. 7A) normal to the corner member 312, i.e., such that angle (f) is 90 degrees, although it is known that the angle of air injection (f) may be varied.

The precise angle (e) necessary to achieve optimal results will vary depending upon the particular configuration of the tangential fired boiler 300 in question, such value being capable of being calculated using combustion computational fluid dynamics (CFD) analysis. However, it has been found that providing an angle (e) of fuel injection with respect to the corner member 312 of between just over 90 degrees (i.e., just over 0 degrees from the normal of the corner member) and 135 degrees (i.e., 45 degrees from the normal of the corner member) provides acceptable results in most circumstances. In the situations tested, it was found that providing an angle (e) of fuel injection with respect to the corner member 312 of between about 105 degrees (i.e., 15 degrees from the normal of the corner member) and 115 degrees (i.e., 25 degrees from the normal of the corner member) provides excellent results.

By providing an angle (e) of fuel injection with respect to the corner member 312 of greater than 90 degrees, a localized fuel rich, oxygen poor zone is created toward a center of the combustion zone 304 and a fuel lean, oxygen rich zone is created toward a periphery of the combustion zone 304. As discussed above, this is illustrated in more detail in FIG. 6B, which shows the generally non-uniform distribution of fuel (indicated by solid arrows R) and oxygen or air (indicated by dashed arrows S). Fuel is mixed with ambient furnace gases in the oxygen poor zone, thus effecting fuel staging. Because of the specific configuration of the boiler and the locations of the fuel inlets, this embodiment achieves a radial fuel staged furnace.

Fuel may be injected uniformly though each of the fuel inlets 306 (as shown in FIG. 7B), or fuel may be injected non-uniformly as discussed above in connection with FIG. 6A.

The present invention, therefore, provides a tangential fired boiler which produces relatively low levels of NOx, which produces a relatively low level of NOx during combustion in addition to or instead of neutralizing the NOx produced during combustion, which maintains a temperature profile therewithin that is conducive to producing relatively low levels of NOx, which employs fuel staging on the boiler level rather than merely on the burner level, and which is relatively simple and inexpensive to install and operate.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A tangential fired boiler comprising:
a circumferential wall defining a combustion zone, said circumferential wall being generally rectangular when viewed along a generally horizontal cross-section;
a fireball disposed within the combustion zone, said fireball rotating about an imaginary axis when viewed along a generally horizontal cross-section;
a corner member disposed proximate to at least one corner of said combustion zone;
a plurality of fuel inlets disposed along said corner member, said plurality of fuel inlets injecting fuel into the combustion zone; and
wherein at least some of said plurality of fuel inlets inject fuel in a direction which is angled with respect to a normal, when viewed along a generally horizontal cross-section, of said corner member and upstream relative to a direction of rotation of said fireball.

2. The tangential fired boiler of claim 1 further comprising a plurality of air inlets disposed along said corner member, said plurality of air inlets injecting air into the combustion zone.

3. The tangential fired boiler of claim 2 wherein at least some of said plurality of air inlets inject air in a direction normal to said corner member.

4. The tangential fired boiler of claim 1 wherein said generally rectangular circumferential wall has a diagonal, and wherein said corner member is angled with respect to a normal of the diagonal and downstream relative to a direction of rotation of said fireball.

5. The tangential fired boiler of claim 4 wherein said corner member is angled with respect to the normal of the diagonal at an angle of about 6 degrees.

6. The tangential fired boiler of claim 4 wherein an angle of said corner member with respect to a normal of the diagonal is adjustable in order to fine-tune performance of said boiler.

7. The tangential fired boiler of claim 1 wherein the angle at which said plurality of fuel inlets inject fuel with respect to a normal of said corner member is greater than zero degrees and less than 45 degrees.

8. The tangential fired boiler of claim 7 wherein the angle at which said plurality of fuel inlets inject fuel with respect to a normal of said corner member is between about 15 degrees and about 25 degrees.

9. The tangential fired boiler of claim 1 wherein a corner member and a plurality of fuel inlets are disposed proximate to each corner of said combustion zone.

10. The tangential fired boiler of claim 1 wherein fuel is injected uniformly through said plurality of fuel inlets.

11. The tangential fired boiler of claim 1 wherein fuel is injected non-uniformly through said plurality of fuel inlets.

12. The tangential fired boiler of claim 1 wherein said corner member is disposed in the at least one corner of said combustion zone.

13. The tangential fired boiler of claim 1 wherein said corner member is disposed offset from, but near, the at least one corner of said combustion zone and in a sidewall of the circumferential wall for convenience in arrangement.

14. The tangential fired boiler of claim 13 wherein said corner member is offset from the at least one corner of said combustion zone downstream relative to the direction of rotation of said fireball, whereby fuel can be injected at a greater angle with respect to a normal of said corner member in order to overcome mechanical limitation or obstruction.

15. A tangential fired boiler comprising:
a circumferential wall defining a combustion zone, said circumferential wall being generally rectangular when viewed along a generally horizontal cross-section and having a diagonal;
a fireball disposed within the combustion zone, said fireball rotating about an imaginary axis when viewed along a generally horizontal cross-section;
a corner member disposed proximate to at least one corner of said combustion zone, said corner member being angled with respect to a normal of the diagonal and downstream relative to a direction of rotation of said fireball;
a plurality of fuel inlets disposed along said corner member, said plurality of fuel inlets injecting fuel into the combustion zone;
a plurality of air inlets disposed along said corner member, said plurality of air inlets injecting air into the combustion zone; and
wherein at least some of said plurality of fuel inlets inject fuel in a direction which is angled between about 15 degrees and about 25 degrees with respect to a normal, when viewed along a generally horizontal cross-section, of said corner member and upstream relative to a direction of rotation of said fireball.

16. The tangential fired boiler of claim 15 wherein at least some of said plurality of air inlets inject air in a direction normal to said corner member.

17. The tangential fired boiler of claim 15 wherein said corner member is angled with respect to the normal of the diagonal at an angle of about 6 degrees.

18. The tangential fired boiler of claim 15 wherein an angle of said corner member with respect to a normal of the diagonal is adjustable in order to fine-tune performance of said boiler.

19. The tangential fired boiler of claim 15 wherein a corner member and a plurality of fuel inlets are disposed proximate to each corner of said combustion zone.

20. The tangential fired boiler of claim 15 wherein fuel is injected uniformly through said plurality of fuel inlets.

21. The tangential fired boiler of claim 15 wherein fuel is injected non-uniformly through said plurality of fuel inlets.

22. The tangential fired boiler of claim 15 wherein said corner member is disposed in the at least one corner of said combustion zone.

* * * * *